US006000611A

United States Patent [19]
Dalton et al.

[11] Patent Number: 6,000,611
[45] Date of Patent: Dec. 14, 1999

[54] ELECTRONIC PRICE LABEL MOUNTING DEVICE AND METHOD

[75] Inventors: Gary C. Dalton, Dacula; David M. Wright, Duluth, both of Ga.

[73] Assignee: NCR Corporation, Dayton, Ohio

[21] Appl. No.: 08/905,988

[22] Filed: Aug. 5, 1997

[51] Int. Cl.[6] ........ G06K 15/00
[52] U.S. Cl. ........ 235/383; 40/651; 40/661.03
[58] Field of Search ........ 235/383; 40/747, 40/661.03, 651

[56] References Cited

U.S. PATENT DOCUMENTS

| | | | |
|---|---|---|---|
| 2,362,273 | 11/1944 | Hopp . | |
| 2,827,718 | 3/1958 | Howard . | |
| 3,014,294 | 12/1961 | Singer . | |
| 3,084,463 | 4/1963 | Guyer et al. . | |
| 4,002,886 | 1/1977 | Sundelin . | |
| 4,500,880 | 2/1985 | Gomersall et al. . | |
| 4,805,331 | 2/1989 | Boggess et al. . | |
| 4,881,707 | 11/1989 | Garfinkle | 40/661.03 |
| 4,924,363 | 5/1990 | Kornelson . | |
| 5,172,314 | 12/1992 | Poland et al. . | |
| 5,289,652 | 3/1994 | Kringel et al. . | |
| 5,408,774 | 4/1995 | Grewe et al. | 40/747 |
| 5,448,226 | 9/1995 | Failing, Jr. et al. . | |

FOREIGN PATENT DOCUMENTS

| | | |
|---|---|---|
| 9307785 | 4/1993 | WIPO . |
| 9319448 | 9/1993 | WIPO . |

*Primary Examiner*—Harold I. Pitts
*Attorney, Agent, or Firm*—Paul W. Martin; Peter H. Priest

[57] ABSTRACT

An electronic price label (EPL) mounting device and method which allows an EPL to be mounted on a shelf at a number of viewing angles. The device includes a first portion coupled to the shelf, and a second portion which retains the EPL and which is rotatably coupled to the first portion. The device may additionally include a retainer for securing a sign to the second portion.

16 Claims, 4 Drawing Sheets

ELECTRONIC PRICE LABEL MOUNTING DEVICE AND METHOD

BACKGROUND OF THE INVENTION

The present invention relates to electronic price label (EPL) systems, and more specifically to an EPL mounting device and method.

EPL systems typically include a plurality of EPLs for each merchandise item in a store. EPLs include displays which display the price of corresponding merchandise items on store shelves and are typically attached to a rail along the leading edge of the shelves. EPL systems typically obtain their prices from the POS server's PLU file. A store may contain thousands of EPLs to display the prices of the merchandise items. The EPLs are coupled to a central server from where information about the EPLs is typically maintained in an EPL data file. The EPL data file contains EPL identification information, and EPL merchandise item information.

Customers find difficulty in viewing typical EPLs for two reasons. First, typical EPLs employ liquid crystal displays (LCDs), due to their low cost. However, LCDs must be viewed head-on. Reading difficulty increases as viewing angles increase. Second, typical EPLs have traditionally been mounted to shelf edges at a single orientation requiring removal and replacement if the shelf height changed. Otherwise, customers find difficulty in viewing items on the lowest and highest of shelves. Variance of customer heights complicates the problem.

Another problem associated with traditional EPL mounting methods is that they do not always facilitate mounting of store specific paper signage or other promotional fixtures.

Therefore, it would be desirable to provide an EPL mounting device and method which is capable of solving these mounting problems.

SUMMARY OF THE INVENTION

In accordance with the teachings of the present invention, an EPL mounting device and method is provided.

The device includes a first portion coupled to the shelf, and a second portion which retains the EPL and which is rotatably coupled to the first portion to allow a display within the EPL to be positioned in a plurality of different viewing angles.

The device may additionally includes a retainer for securing a sign to the second portion.

It is accordingly an object of the present invention to provide an EPL mounting device and method.

It is another object of the present invention to provide an EPL mounting device and method which make shelf-mounted EPL displays visible to as many customers as possible without requiring excessive customer movement in order to view the displays.

It is another object of the present invention to provide an EPL mounting device and method which allows a shelf-mounted EPL to be rotated upwards and downwards within a range of mounting angles.

It is another object of the present invention to provide an EPL mounting device and method which allows a shelf-mounted EPL to be rotated upwards and downwards within a range of mounting angles, and which is capable of securing promotional fixtures, including signs.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
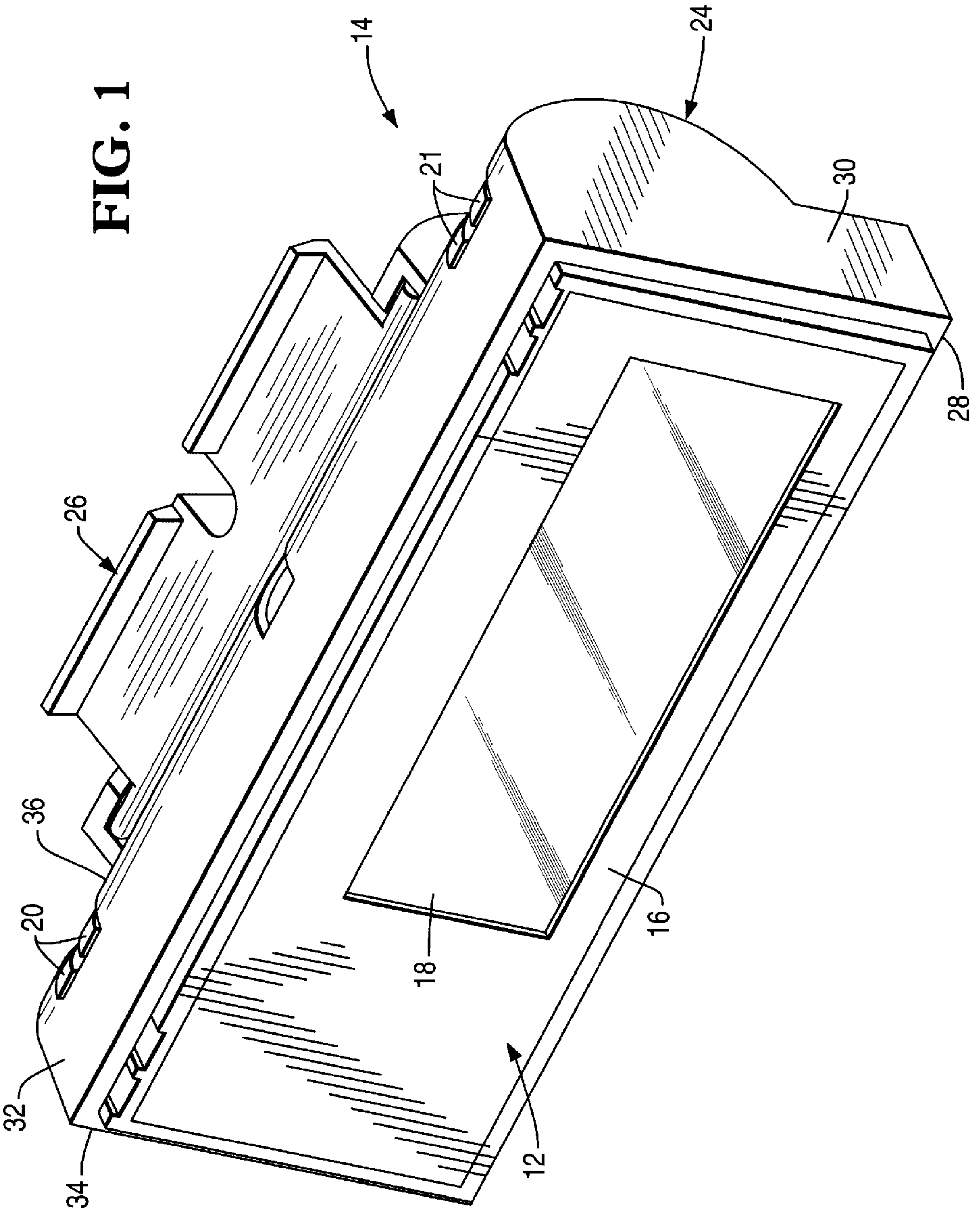
FIG. 1 is a front perspective view of an EPL assembly including the EPL mounting device.

Referring now to FIG. 1, EPL assembly 10 includes EPL 12 and universal mounting device 14.

EPL 12 includes housing 16 and display 18.

Housing 16 is substantially box-like in shape and includes pairs of locking tabs 20 and 21 and feet 22 (FIG. 3) for retaining EPL 12 within device 14.

Universal mounting device 14 includes an EPL containment portion 24 and a shelf coupler 26.

EPL containment portion 24 is preferably made of molded plastic and includes walls 28–36. Walls 28–34 are planar and form a frame for an opening having substantially similar dimensions as the perimeter of EPL 12.

EPL 12 is inserted within EPL containment portion 24 by inserting the bottom edge and feet 22 first, and inserting the top edge and locking tabs 20 and 21 last. Removal is accomplished in reverse after using a key to depress locking tabs 20 and 21.

Figure 2:
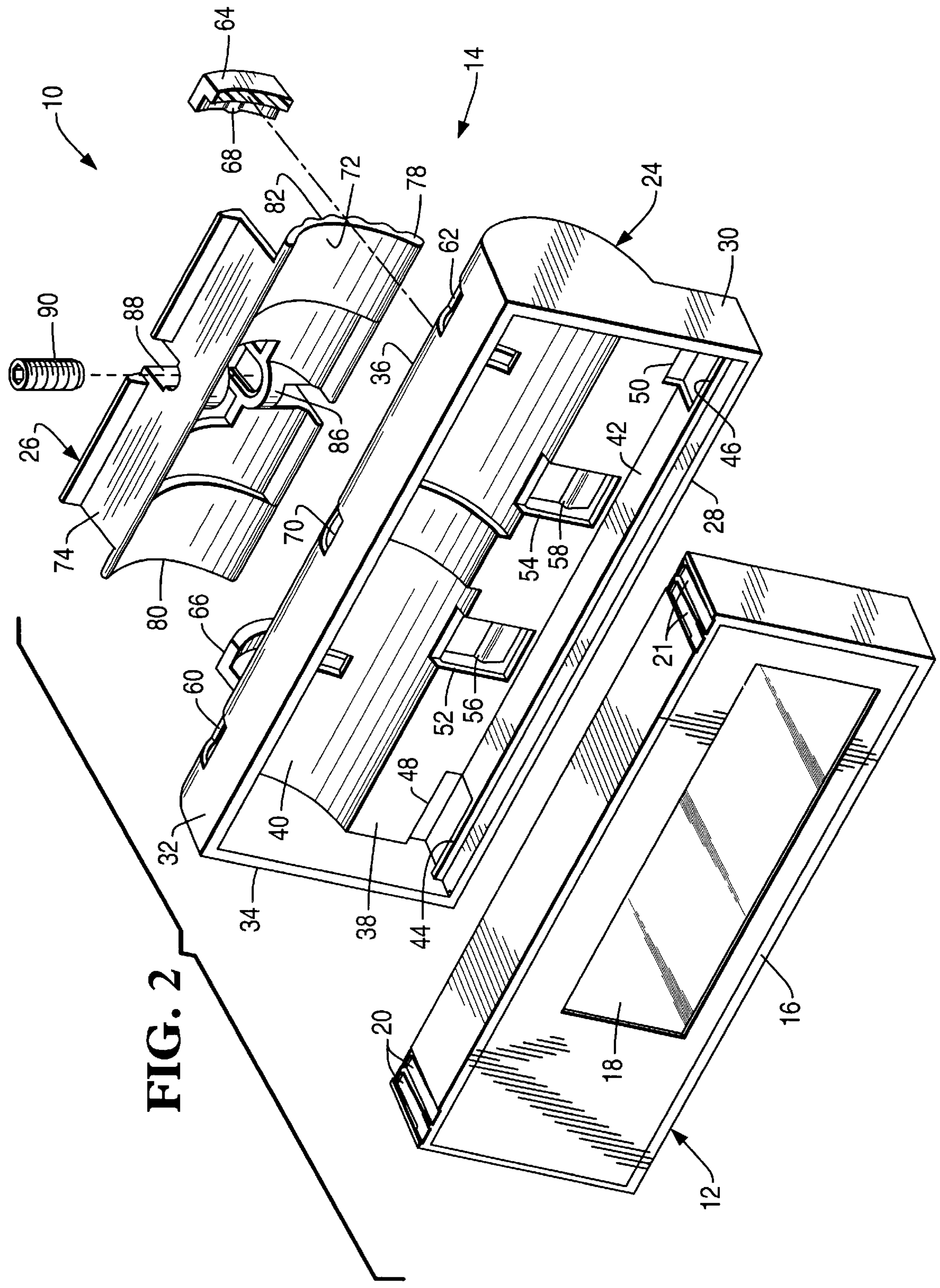
FIG. 2 is an exploded view of an EPL assembly including the EPL mounting device of the present invention.
Figure 3:
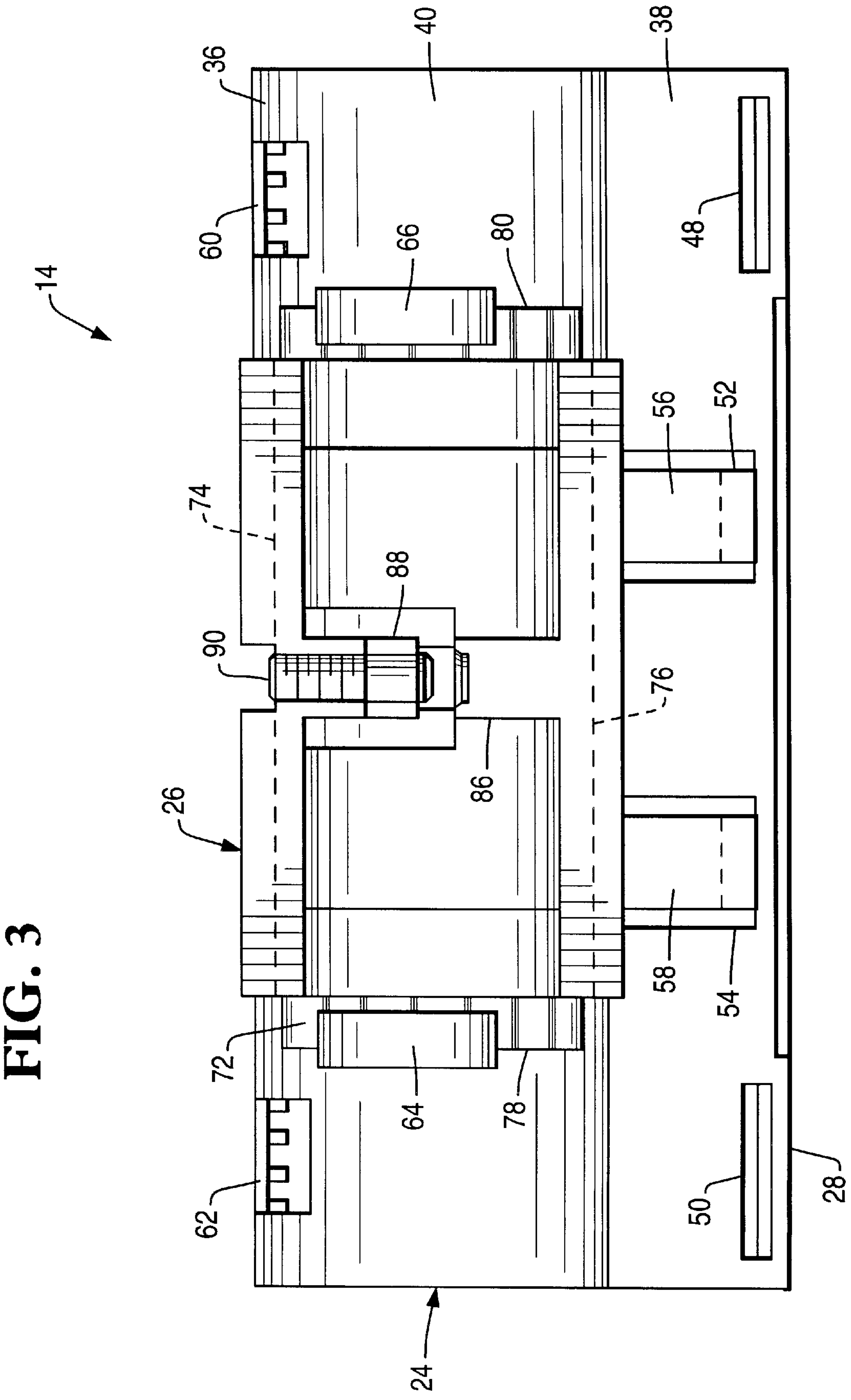
FIG. 3 is a rear view of the EPL assembly.

With reference to FIGS. 2 and 3, wall 28 includes bottom support member 42 upon which EPL 12 sits. Bottom support member 42 includes end portions 44 and 46 which retain feet 22 in place within EPL containment portion 24.

Wall 36 includes a flat portion 38 and a curved portion 40. Flat portion 38 includes feet viewing apertures 48 and 50 and sign retaining apertures 52 and 54. Feet viewing apertures 48 and 50 allow an operator to access feet 22 and end portions 44 and 46.

Curved portion 40 includes tab viewing apertures 48 and 50, sign receiving apertures 52 and 54, sign retaining tabs 56 and 58, shelf coupler retainers 64 and 66, and channel 70.

Tab viewing apertures 48 and 50 are located near the upper edge of curved portion 40 and allow an operator to access locking tabs 20 and 21.

Sign retaining tabs 56 and 58 extend downwards from the bottom edge of curved portion 40.

Sign receiving apertures 52 and 54 work in connection with sign retaining tabs 56 and 58 to securely retain a sign, such as a "shelf talker" or other sign made of a flexible paper product.

Shelf coupler retainers 64 and 66 are generally L-shaped and include protrusions 68 which retain shelf coupler 26 at a fixed angular orientation θ (FIGS. 4–5) with respect to EPL containment portion 24.

Channel 70 provides room for threaded channels 86 and 88 and fastener 90 of shelf coupler 26 to travel along the convex surface of curved portion 40.

Shelf coupler 26 includes curved portion 72 and shelf engaging members 74 and 76 (FIG. 3). Shelf coupler may be made of metal, plastic, or other suitable material.

Curved portion 72 has the same curvature as curved portion 40 of EPL containment portion 24. Curved portion 72 includes angle adjusting ends 78 and 80 which are characterized by a plurality of dimples 82 arranged in serial fashion from one edge of curved portion 72 to the other. Dimples 82 work with protrusions 68 to retain EPL containment portion 24 at a fixed angular orientation θ (FIGS. 4 and 5) with respect to shelf coupler 26.

Five dimples are shown. Each dimple represents about thirteen to fifteen degrees of movement. The maximum range of motion is about sixty-five degrees. Maximum and minimum viewing angles ϕ may vary with variations in C-channel angles α (FIG. 4) relative to a vertical line.

Figure 4:
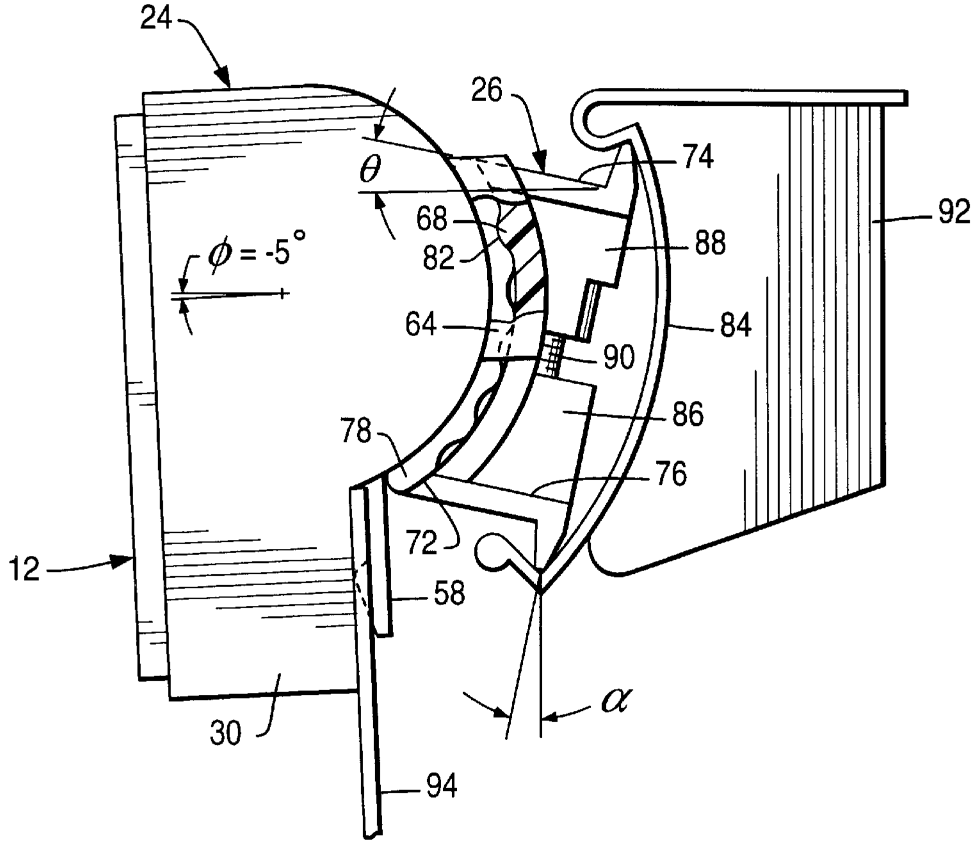
FIG. 4 is a side view of the EPL assembly showing the EPL mounting device in a first orientation with respect to a shelf.

Shelf engaging members 74 and 76 are generally L-shaped and contact the upper and lower edges of a C-channel of a shelf edge (FIG. 4). Shelf engaging members 74 and 76 are retained in place by the C-channel by moving them outwardly in opposite directions until an operator feels sufficient tightening force. For this purpose, shelf engaging members 74 and 76 include threaded channels 86 and 88 and fastener 90. An operator turns fastener 90 in one direction to spread shelf engaging members 74 and 76 to install EPL assembly 10, and turns fastener 90 in the other direction to collapse shelf engaging members 74 and 76 to remove EPL assembly 10 from C-channel 84.

Figure 5:
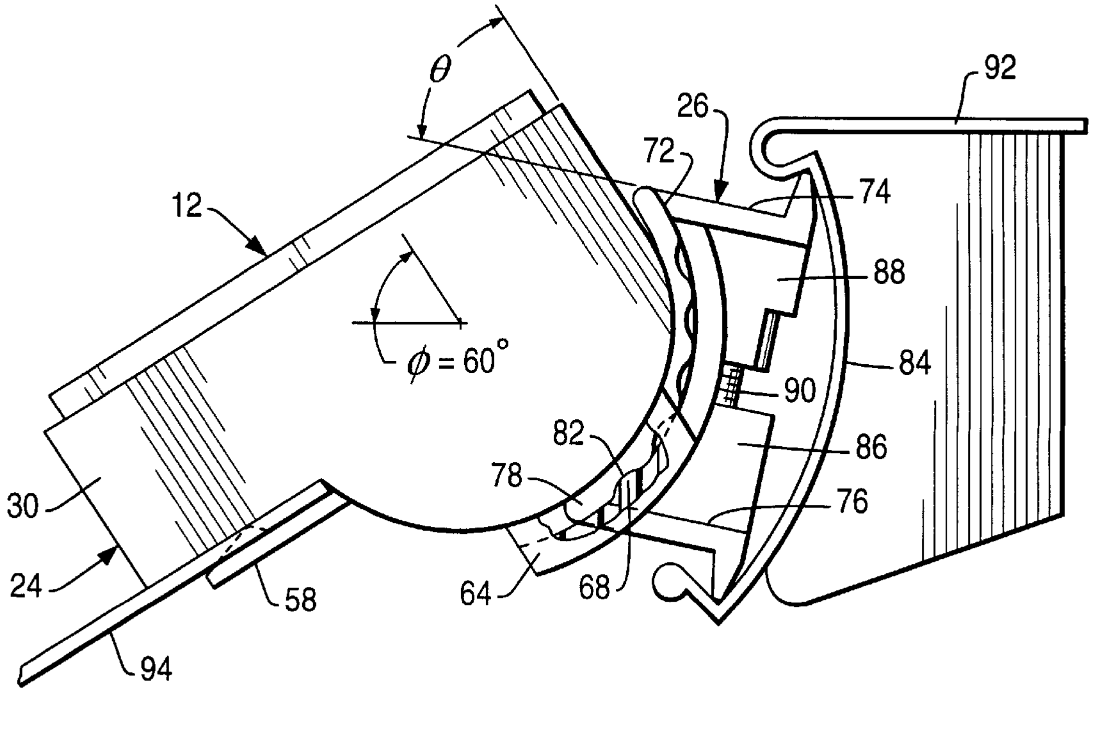
FIG. 5 is a side view of the EPL assembly showing the EPL mounting device in a second orientation with respect to a shelf.

Turning now to FIGS. 4–5, EPL assembly 10 is shown attached to C-channel 84 of shelf 92.

FIG. 4 illustrates a first maximum viewing angle ϕ of about five degrees downwards, as measured between a normal line to EPL 12 and a horizontal line. This orientation may be used for shelves at maximum heights.

FIG. 5 illustrates a second maximum viewing angle ϕ of about sixty degrees upwards. This orientation may be used for lowest shelves.

Table 1 illustrates preferred viewing angles ϕ as a function of shelf height:

TABLE I

| Height Range | Viewing Angle ϕ |
|---|---|
| Floor–2 ft. | +45° |
| 2 ft.–4 ft. | +30° |
| 4 ft.–6 ft. | 0° |
| 6 ft.–8 ft. | −5° |

Also illustrated within FIGS. 4 and 5 is the retention of sign 94 by sign retaining tabs 56 and 58 and sign receiving apertures 52 and 54. Sign 94 is inserted between sign retaining tabs 56 and 58 and sign receiving apertures 52 and 54.

In this same fashion, EPL assembly 10 may attach to merchandising signs and other types of promotional materials. This attachment method may also be used to attach the EPL to an "endcap" sign or other large sign.

Although the present invention has been described with particular reference to certain preferred embodiments thereof, variations and modifications of the present invention can be effected within the spirit and scope of the following claims.

We claim:

1. A device for mounting an electronic price label (EPL) to a shelf to enhance viewability comprising:

a first portion coupled to the shelf; and a second portion which retains the EPL and which is rotatably coupled to the first portion to allow a front face of a display of the EPL to be positioned in a plurality of different viewing angles, said viewing angles being defined by lines normal to the front face of the display with respect to horizontal at the plurality of different viewing angles.

2. The device as recited in claim 1, wherein the second portion further comprises:

a retainer for securing a sign to the second portion.

3. A device for mounting an electronic price label (EPL) to a shelf to enhance viewability comprising:

a first portion coupled to the shelf, including
  a first curved portion including first and second angle adjusting ends; and
  shelf engaging members coupled to the first carved portion; and a second portion including
  a housing for retaining the EPL including a back wall which has a second curved portion which rotatably engages the first curved portion; and
  first and second retainers which engage the first and second angle adjusting ends to retain the second portion at a number of fixed angular orientations with respect to the first portion, said fixed angular orientations being defined by the angles of lines normal to a front face of the EPL with respect to horizontal.

4. The device as recited in claim 3, wherein the second portion further comprises:

a number of apertures in the back wall; and a number of sign retaining tabs adjacent the apertures for securing a sign to the second portion.

5. An electronic price label (EPL) assembly having enhanced viewability comprising:

an EPL having a display; and a device for adjustably mounting the EPL to a shelf including
  a first portion coupled to the shelf; and
  a second portion which retains the EPL and which is rotatably coupled to the first portion to allow the display within the EPL to be positioned in a plurality of different viewing angles, said angles being defined by the angles of lines normal to the display of the EPL with respect to horizontal.

6. An electronic price label (EPL) system comprising:

a plurality of EPLs having displays, including first and second groups of EPLs assigned to first and second shelves of different heights; and a device for mounting each of the EPLs to one of the shelves including
  a first portion coupled to the one shelf; and
  a second portion which retains the EPL and which is rotatably coupled to the first portion to allow the displays within the EPLs to be positioned in a plurality of different viewing angles;

wherein a first group of EPLs is mounted to the first shelf at a first viewing angle defined as the angle of lines normal to the displays of the first group of EPLs with respect to horizontal; and wherein a second group of EPLs is mounted to the second shelf at a second viewing angle defined as the angle of lines normal to the displays of the second group of EPLs with respect to the horizontal, and different from the first viewing angle.

7. An electronic price label (EPL) mounting method comprising the steps of:

determining a height of a shelf to which the EPL is to be mounted;

providing a device for mounting the EPL to the shelf at a plurality of different viewing angles defined as the angles of lines normal to a display of the EPL make with the horizontal when the EPL is mounted at the plurality of different viewing angles;

determining a preferred viewing angle based upon the height; and mounting the EPL to the shelf at the preferred viewing angle.

8. The device as recited in claim 1 wherein the plurality of different angles range from about −5° downwards for mounting an EPL at a maximum height shelf to about 60° upwards for mounting an EPL at a lowest height shelf.

9. The device recited in claim 1 wherein the second portion may be rotated in fixed increments of about thirteen to fifteen degrees.

10. The device recited in claim 1 wherein the second portion includes end portions for receiving feet located on the bottom of the EPL.

11. The device of claim 10 wherein the second portion further comprising locking tab receiving apertures for receiving locking tabs on the top of the EPL.

12. The device of claim 10 wherein the second portion further comprises feet viewing apertures allowing an operator to access the feet and the end portions.

13. The device of claim 1 wherein the first portion further comprises two angle adjusting end pieces with a plurality of dimples for adjusting the plurality of different viewing angles in fixed increments.

14. The device of claim 1 wherein the first portion further comprises adjustable shelf engaging members for coupling the first portion to a c-channel in a front edge of the shelf.

15. The device of claim 14 wherein a rotatable fastener is turned in a first direction to spread the adjustable shelf engaging members to install the first portion, and is turned in a second direction to collapse the adjustable shelf engaging members to remove the first portion.

16. The device of claim 2 wherein the retainer comprises sign receiving apertures and sign retaining tabs which cooperate to securely retain a flexible shelf talker.

* * * * *